United States Patent [19]

Corliss et al.

[11] 3,930,033

[45] Dec. 30, 1975

[54] SIMULATED BACON PRODUCT AND PROCESS THEREFOR

[75] Inventors: Glenn Arthur Corliss, Clarendon Hills; Henry Paul Furgal, Lombard, both of Ill.

[73] Assignee: Miles Laboratories, Inc., Elkhart, Ind.

[22] Filed: Feb. 4, 1974

[21] Appl. No.: 439,356

[52] U.S. Cl. .............. 426/103; 426/104; 426/249; 426/802
[51] Int. Cl.² ................. A23J 3/00; A23L 1/275
[58] Field of Search ............ 426/93, 104, 249, 802, 426/103

[56] References Cited
UNITED STATES PATENTS

| | | | |
|---|---|---|---|
| 3,320,070 | 5/1967 | Hartman | 426/104 |
| 3,442,662 | 5/1969 | Robinson | 426/104 |
| 3,537,859 | 11/1970 | Hamdy | 426/250 X |
| 3,589,914 | 6/1971 | Cooper et al. | 426/104 |

FOREIGN PATENTS OR APPLICATIONS

| | | | |
|---|---|---|---|
| 872,186 | 6/1971 | Canada | 426/104 |

*Primary Examiner*—James R. Hoffman
*Attorney, Agent, or Firm*—Louis E. Davidson

[57] ABSTRACT

A simulated bacon can be produced by forming and stacking alternate red and white vegetable protein -containing layers to simulate lean meat and fat and then cooking the stacked layers to form a slab. Simulated bacon slices can be produced by slicing such slab transversely to the layers. The individual layers are produced from separate aqueous mixtures containing critical amounts of vegetable protein fiber, egg albumen, tapioca starch, water, vegetable oil, vegetable gum, vegetable protein isolate, dextrose, sodium caseinate, colorings, flavors and seasonings.

11 Claims, No Drawings

SIMULATED BACON PRODUCT AND PROCESS THEREFOR

BACKGROUND AND PRIOR ART

Simulated bacon has been described in U.S. Pat. Nos. 3,320,070; 3,442,662; 3,537,859 and 3,589,914 and in Canadian Pat. No. 872186. These patents describe various mixtures of vegetable proteins and binders along with colorings and flavors which are employed to simulate the lean meat and fat portions of natural bacon. While these prior art compositions may in a generic sense simulate bacon, they all have the disadvantages of not having the same mouth feel and cooked appearance of natural bacon. As a result they do not have wide acceptance in the commercial marketplace as a true substitute for bacon.

SUMMARY OF THE INVENTION

In accordance with the present invention, a simulated bacon product is provided having alternate layers simulating the lean and fat portions of bacon, the layers simulating the lean portions being produced from an initial composition consisting essentially of 10 to 40 percent vegetable protein fiber, 5 to 20 percent egg albumen, 5 to 20 percent tapioca starch, 30 to 60 percent water, 3 to 20 percent vegetable oil, 0.1 to 1.5 percent vegetable gum, 2 to 15 percent vegetable protein isolate, 0.05 to 0.50 percent dextrose, 0.005 to 0.05 percent food grade coloring and 5 to 20 percent flavors and seasonings, and the layers simulating the fat portions being produced from an initial composition consisting essentially of 0 to 5 percent vegetable protein fiber, 5 to 20 percent egg albumen, 3 to 20 percent tapioca starch, 30 to 60 percent water, 10 to 40 percent vegetable oil, 0.1 to 1.5 percent vegetable gum, 2 to 15 percent vegetable protein isolate, 4 to 15 percent sodium caseinate, 0.05 to 0.50 percent dextrose, and 5 to 20 percent flavors and seasonings, said percents being weight percent based on the total weight of the layer composition. This product is produced by forming and stacking alternate layers of the simulated lean and fat portions to form a simulated bacon slab and then cooking such slab. During this cooking the slab expands from 15 to 40 volume percent to produce a tender, flaky texture in the final product.

DESCRIPTION OF THE INVENTION

The vegetable protein fibers employed in the present invention are prepared in a well-known manner by extruding vegetable protein, such as that obtained from soy beans, corn or peanuts, through a spinerette into an acid bath where the extruded material is coagulated into fibers. This is described in U.S. Pat. No. 2,682,466 The resulting fibers can be stretched, washed to desired pH and then cut into desired lengths.

Vegetable protein isolate, such as soy isolate, is a commercially available material containing at least 90 weight percent protein.

The vegetable oil suitable in this invention is preferably corn oil, but other commercially available vegetable oils can also be used.

The vegetable gum suitable in this invention is preferably carrageenan, but other vegetable gums, such as seaweed extract, guar gum or locust bean gum, can also be used.

The red color useful for simulating lean meat is preferably obtained by a mixture of FDC Red No. 3 and FDC Yellow No. 6 food grade colors, but other suitable commercially available food grade colors can also be used.

The composition also preferably contains from about 0.1 to about 0.7 weight percent caramel color. An especially useful amount is 0.34 percent.

The suitable flavors are a mixture of autolyzed yeast, hydrolyzed yeast and other vegetable or artificial flavors which combine to provide a "bacon flavor". Such selection is within the knowledge of those skilled in the art.

The other ingredients of the compositions are well-known commercially available materials.

The specific mixtures suitable for production of the individual simulated lean and fat portions of the simulated bacon product are set forth above in the "Summary of the Invention". The preferred product has layers simulating the lean portions being produced from an initial composition consisting essentially of about 18 percent vegetable protein fiber, about 10 percent egg albumen, about 7.5 percent tapioca starch, about 42.5 percent water, about 6.7 percent vegetable oil, about 0.5 percent vegetable gum, about 3.4 percent vegetable protein isolate, about 0.16 percent dextrose, about 0.01 percent food grade coloring, about 0.34 percent caramel color and about 10.89 percent flavors and seasonings. The layers simulating the fat portions are produced from an initial composition consisting essentially of about 1.5 percent vegetable protein fiber, about 8.2 percent egg albumen, about 5.8 percent tapioca starch, about 42.3 percent water, about 25.7 percent vegetable oil, about 0.2 percent vegetable gum, about 2.6 percent vegetable protein isolate, about 5.2 percent sodium caseinate, about 0.12 percent dextrose and about 8.38 percent flavors and seasonings. All of the above percents are by weight based on the total weight of the layer composition.

The simulated bacon product is produced by forming and stacking alternate layers of the simulated lean and fat portions to form a simulated bacon slab and then cooking such slab. This cooking step "sets" the fiber and binder materials together into a coherent mass. This cooking is carried out until the internal temperature of the simulated bacon slab is at least 75°C. Such cooking is conveniently carried out at a temperature of about 75° to 95°C. Any convenient heating means can be employed.

Prior to the formation of the individual layers, the ingredients are mixed with an aerating type mixer so as to entrap air or other non-toxic gas within the mixture. An alternative procedure is to force air or other non-toxic gas into the mixture through a suitably designed orifice to provide extensive dispersion of fine bubbles throughout the mixture. Still a further alternative is to include in the mixture a leavening agent, such as sodium bicarbonate or commercial baking powder, which will generate gas during subsequent heating. The amount of entrapped or internally generated gas is such that during the cooking of the resulting slab, the slab expands from about 15 to about 40, preferably from about 20 to about 25, volume percent. During the cooking the entrapped or internally generated gas expands slightly and forms numerous small bubbles which become a permanent feature of the finished product after the mixture is coagulated during heating. This enables the cooked product to develop a tender, flaky texture which simulates the texture of natural bacon.

The invention is described in further detail in the following example.

EXAMPLE

A mixture of water, food grade coloring, caramel color, corn oil and liquid flavors was blended together. Chopped spun soy protein fiber having pH 5.0 and strands each about 1/16 in. (1.6 mm.) long was added and allowed to mix in the liquids to allow absorption of water and oil by the protein fibers, Egg albumen, tapioca starch, carrageenan, soy isolate, dextrose, and powdered flavors and seasonings were added and mixing was continued in an aerating type mixer, such as a Littleford Lodige Mixer, until the mixture was homogeneous. The resulting first mixture which is intended to be used as a simulated lean meat portion contained 18 percent spun fiber, 10 percent egg albumen, 7.5 percent tapioca starch, 42.5 percent water, 6.7 percent corn oil, 0.5 percent carrageenan, 3.4 percent soy isolate, 0.34 percent caramel color, 0.16 percent dextrose, 0.01 percent color (mixture of 75 percent FDC Red No. 3 and 25 percent FDC Yellow No. 6) and 10.89 percent flavors and seasonings, said percents being by weight based on the total weight of the mixture.

A second mixture was produced by blending together water, corn oil, liquid flavors and chopped spun soy protein fiber. Egg albumen, tapioca starch, carageenan, soy isolate, sodium caseinate, and powdered flavors and seasonings were added and mixing was continued in an aerating type mixer, such as a Littleford Lodige Mixer, until the mixture was homogeneous. The resulting second mixture which is intended to be used as a simulated fat portion contained 1.5 percent spun fiber, 8.2 percent egg albumen, 5.8 percent tapioca starch, 42.3 percent water, 25.7 percent corn oil, 0.2 percent carrageenan, 2.6 percent soy isolate, 5.2 percent sodium caseinate, 0.12 percent dextrose and 8.38 percent flavors and seasoning, said percents being by weight based on the total weight of the mixture.

The above-described first and second mixtures containing entrapped air were then applied as alternate layers, one upon the other, each layer being from 0.5 to 0.75 cm. thick, until a slab of about 2.5 cm. thickness was obtained. This slab was about 18 cm. wide and about 29 cm. long. The slab was then cooked by externally heatng it with steam to an internal temperature of 75° to 95°C. During this heating the slab expanded about 20 to 25 volume percent. The product in the form of a solid slab was then allowed to cool to 4°C. and was then sliced transversely to the layers in slices about 0.18 cm. thick, packaged and frozen for subsequent sale as a simulated bacon product.

Slices prepared as described above, when subsequently heated, as in a frying pan, have a resulting taste and mouth feel which is substantially the same as cooked natural bacon.

The red portion provides a crispy, moderately juicy, lean appearing dark portion which very closely resembles bacon lean meat whereas the white portion has a crisper, flakier texture much like that of fried bacon fat. This product is also superior to bacon in several aspects. It contains no cholesterol, it has a higher Protein Efficiency Ratio (PER) than bacon (about 3 as compared to 2.7 for lean meat) and it has a desirably high ratio of poly-unsaturated fats to saturated fatty acids. This product has a ratio of polyunsaturated to saturated fats in excess of 1:1. In contrast to natural bacon has a similar ratio in an amount of only 0.25:1.

What is claimed is:

1. A simulated bacon product having alternate expanded cooked layer simulating the lean and fat portions of bacon, the expanded layer simulating the lean portions being produced by cooking a composition mixture consisting essentially of 10 to 40 percent vegetable protein fiber, 5 to 20 percent egg albumen, 5 to 20 percent tapioca starch, 30 to 60 percent water, 3 to 20 percent vegetable oil, 0.1 to 1.5 percent vegetable gum, 2 to 15 percent vegetable protein isolate, 0.05 to 0.50 percent dextrose, 0.005 to 0,05 percent food grade coloring and 5 to 20 percent flavors and seasoning, said composition mixture also containing a gas dispersed therein, and the expanded layers simulating the fat portions being produced by cooking a composition mixture consisting essentially of 0 to 5 percent vegetable protein fiber, 5 to 20 percent egg albumen, 3 to 20 percent tapioca starch, 30 to 60 percent water, 10 to 40 percent vegetable oil, 0.1 to 1.5 percent vegetable gum, 2 to 15 percent vegetable protein isolate, 4 to 15 percent sodium caseinate, 0.05 to 0.50 percent dextrose, and 5 to 20 percent flavors and seasonings, said composition mixture also containing a gas dispersed therein, said percents being weight percent based on the total weight of the layer composition.

2. A simulated bacon product according to claim 1 wherein the expanded layers simulating the lean portions are produced by cooking a composition mixture consisting essentially of about 18 percent vegetable protein fiber, about 10 percent egg albumen, about 7.5 percent tapioca starch, about 42.5 percent water, about 6.7 percent vegetable oil, about 0.5 percent vegetable gum, about 3.4 percent vegetable protein, about 0.16 percent dextrose, about 0.01 percent food grade coloring, about 0.34 percent caramel color and about 10.89 percent flavors and seasonings, said composition mixture also containing a gas dispersed therein, and the expanded layers simulating the fat portions are produced by cooking a composition mixture consisting essentially of about 1.5 percent vegetable protein fiber, about 8.2 percent egg albumen, about 5.8 percent tapioca starch, about 42.3 percent water, about 25.7 percent vegetable oil, about 0.2 percent vegetable gum, about 2.6 percent vegetable protein isolate, about 5.2 percent sodium caseinate, about 0.12 percent dextrose and about 8.38 percent flavors and seasonings, said composition mixture also containing a gas dispersed therein, said percents being weight percent based on the total weight of the layer composition.

3. A simulated bacon product according to claim 2 wherein the vegetable protein fiber is produced from soy protein, the vegetable protein isolate is soy isolate and the food grade coloring is a mixture of FDC Red. No. 3 and FDC Yellow No. 6 food grade colors.

4. A process for the production of a simulated bacon product which comprises introducing a gas into the individual composition mixtures for the simulated lean and fat portions, forming and stacking alternate individual layers of the simulated lean and fat portions set forth in claim 2 to form a simulated bacon slab and then cooking such slab whereby the slab expands from about 15 to about 40 volume percent during such cooking.

5. A process according to claim 4 wherein such cooking is carried out at 75° - 95°C.

6. A process for the production of simulated bacon slices which comprises producing an expanded simulated bacon slab according to claim 4 and then slicing such expanded slab transversely to the layers to form simulated bacon slices having alternating portions simulating lean meat and fat.

7. A simulated bacon product according to claim 1 wherein the vegetable protein fiber is produced from soy protein, the vegetable protein isolate is soy isolate and the food grade coloring is a mixture of FDC Red No. 3 and FDC Yellow No. 6 food grade colors.

8. A process for the production of a simulated bacon product which comprises introducing gas into the individual composition mixtures for the simulated lean and fat portions, forming and stacking alternate individual layers of the simulated lean and fat portions set forth in claim 1 to form a simulaated bacon slab and then cooking such slab whereby the slab expands from about 15 to 40 volume percent during such cooking.

9. A process according to claim 8 wherein such cooking is carried out at 75° – 95°C.

10. A process for the production of simulated bacon slices which comprises producing an expanded simulated bacon slab according to claim 8 and then slicing such expanded slab tansversely to the layers to form simulated bacon slices having alternating portions simulating lean meat and fat.

11. A process according to claim 8 wherein the gas is introduced by aeration.

* * * * *